GREETING CARD

Filed March 29, 1967

Joe Slovacek
INVENTOR.

BY Carl B. Fox, Jr.
ATTORNEY

United States Patent Office 3,487,573

Patented Jan. 6, 1970

3,487,573

GREETING CARD

Joe Slovacek, 1015 Austin, Pasadena, Tex. 77502

Filed Mar. 29, 1967, Ser. No. 626,883
Int. Cl. G09f *1/00*
U.S. Cl. 40—124.1 4 Claims

ABSTRACT OF THE DISCLOSURE

The disclosure is of greeting cards of novel form, wherein movement of one portion results in change of sentiment expressed by the cards, even though another portion of the cards is continuously in view and has utility in expression of each of the sentiments.

BACKGROUND OF THE INVENTION

Field of the invention

The field of the invention is the greeting card art. While numerous types of greeting cards are in use at the present time, new types are always being developed and added, and this invention is an improvement in this area.

SUMMARY

The invention pertains to greeting cards, the structure of which includes a base part and a part removably disposed over a portion of the base part. On one portion there is printed one or more words which suggest to the viewer one sentiment, and on the removably overlaid portion are formed parts of a word or words which together with part of the first-named words suggest a completely distinct and different sentiment. The word or words viewed when the covering portion is in place utilize portions of the word or words on the base portion. The utility of the invention is that of creating the emotion of shock. On first viewing the card with the covering portion in place the viewer receives an impression which is completely changed or altered when the covering portion of the card is moved to display the base portion.

DESCRIPTION OF THE PREFERRED EMBODIMENT

Figures 1, 2, 3, 4, 5:
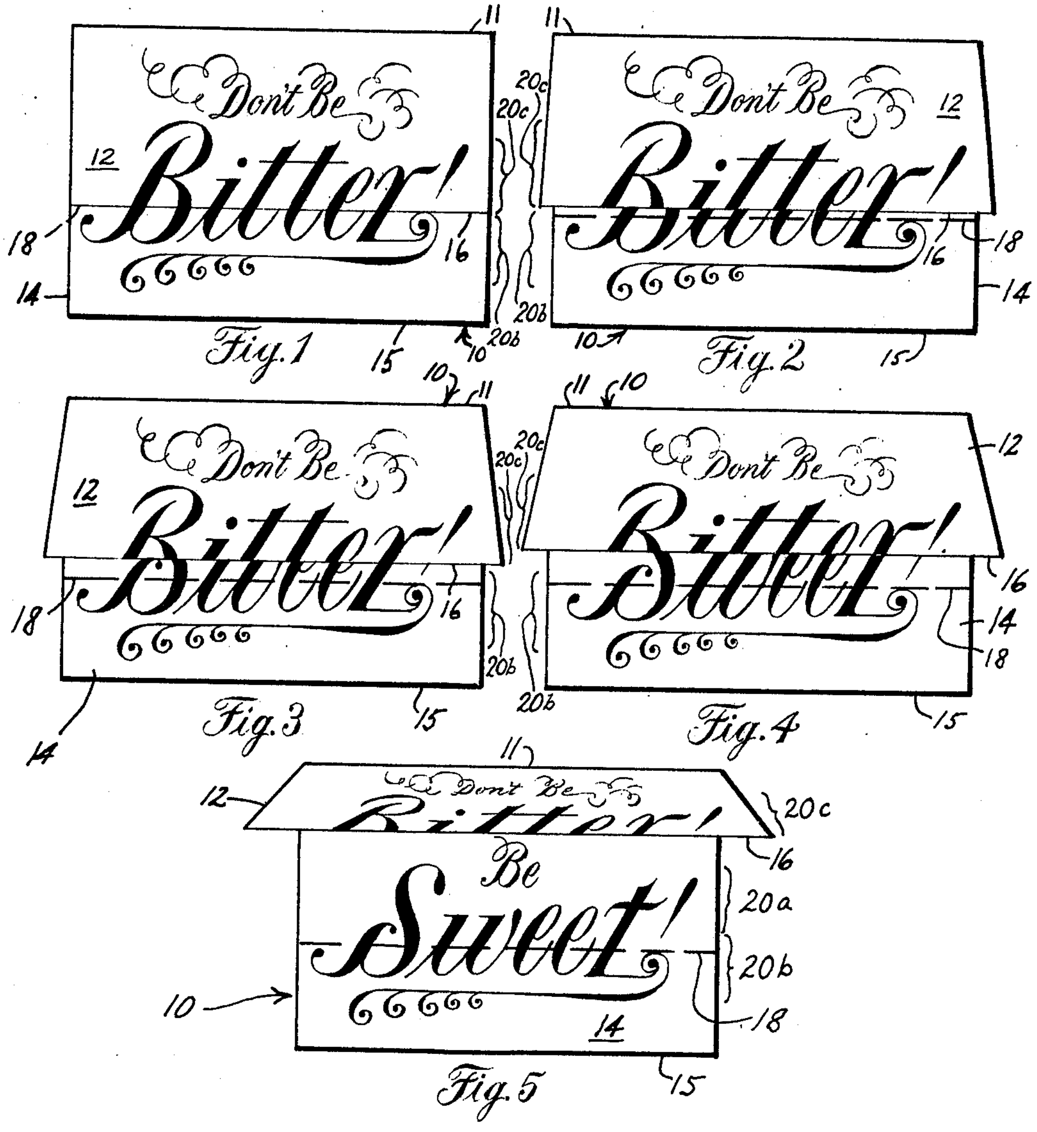
FIGS. 1–5 of the drawings are elevational views showing a series of positions of the covering portion of the card with respect to the base part of the card.

Referring now to the drawings, a greeting card indicated generally by reference numeral 10 has a bend or fold 11, so that card portion 12 covers the card portion 14. The card is of uniform width from the lower end or side 15 of the card past the fold 11 to the opposite end or side 16 of the card. The overlaid portion 12 of the card does not completely cover the underneath card portion 14, the area beyond line 18 being the uncovered portion.

The sides of the card portions extending oppositely from the fold line may coincide when overlaid as shown in the drawings, or may be of different shapes and/or angles so as not to coincide when overlaid. One card portion edge must always pass across the face of the other card portion when the card portions are folded flushly together.

On the card portion 14 there is disposed the word "Sweet!" and on the card portion 12 there is disposed the upper portions of the word "Bitter!," an exclamation point accompanying each word. The lower portion of the word "Bitter," which is absent from the card portion 12, is exactly the same as the lower portion of the word "Sweet," as disposed on the card portion 14 beneath line 18. The lower portions of each of these words are read from the underlaid part of the card.

When card portion 12 covers the part of card portion 14 above line 18, as shown in FIG. 1, the observer sees the complete expression "Don't be Bitter!" with the lower edge 16 of card portion 12 running through the word "Bitter." Then as shown in the series of drawings, FIGS. 2–4, the card portion 12 is moved progressively away from its flush position of FIG. 1 toward its open position as in FIG. 5.

Lower edge 16 of overlaid card portion 12 is shown to be straight in the preferred embodiment shown in the drawings, but it will be realized that a lower edge which is angular, curved, scalloped, or of any other form may be employed.

Lower edge 16 of card part 12 forms a division line between three word element groups appearing on cards made according to the invention. When the part 12 is flushly against part 14, as shown in FIG. 1, the position of edge 16 is along the line 18, the line 18 of course not being present on the cards but being shown in the drawing only to indicate the division between word elements of card part 14. The word "Sweet" and the exclamation point following are made up of a word element group **20*a* falling above the position of line 18 and a word element group 20*b* falling below the position of line 18 (and the position of the edge 16 when card part 12 is fully folded down). The third word element group 20*c* is disposed above edge 16 on card part 12. The word "Bitter" is made up of groups 20*b* and 20*c*, while the word "Sweet" is made up of groups 20*b* and 20*a***.

For understanding of the sentiment conveyed by a card manufactured in accordance with the invention, all three of the word element groups are necessary, and it is further necessary that one of the substitutable groups **20*a*, 20*c* be on a card part movable with respect to group 20*b***.

The positions of groups **20*a* and 20*c* may be interchanged, with group 20*a* moved to card part 12 and group 20*c* moved to card part 14**.

In place of the words of opposite meanings "Sweet-Bitter," the groups may be made up of any other word combinations such as "Sweet-Sour," "Hot-Cold," "Dry-Wet," "Friend-Foe," which have contrasting meanings, or such as "Sweet-Sugar," "Puppy-Dog," "Pussy-Cat," "Fire-Alarm," or any other word combination which will produce the desired effect when the movable card part is moved from one of its positions to the other of its positions with respect to word element group **20*b***.

The printed words of themselves are not parts of the invention out of combination with the movable structural elements necessary to complete the invention.

There must be provided the three described word element groups, and of these two must be on card parts interchangeable for view, and the card structure must provide correct positioning of one word element group with respect to the two interchangeable word element groups. The indicia disposed along the position of (imaginary) line 18, must coincide with indicia at edge 16.

While a preferred embodiment according to the invention has been shown and described, many modifications thereof may be made by a person skilled in the art without departing from the spirit of the invention, and it is intended to protect by Letters Patent all forms of the invention falling within the scope of the following claims:

1. Greeting card structure, comprising planar card means having a fold line thereacross whereby a first portion of said card means at one side of said fold line is foldable at said fold line to cover a part of one side of a second portion of said card means at the other side of said fold line, an edge of said first portion defining a dividing line across said second portion when said first portion is folded to flushly cover said part of said second portion, identical indicia means disposed along said edge and along said dividing line, said first card means portion having a first word element group extending from said indicia means along its said edge, said second card means portion having a second word element group on its part covered by said first portion extending from said indicia means along said dividing line and having a third word element group on its other part extending from said indicia means along said dividing line, at least said third word element group being of incomprehensible, meaningless, form when viewed alone but said first and third word element groups together forming first meaningful word means when said edge is laid along said dividing line and said second and third word element groups together forming different second meaningful word means, said first and second word element groups being upper portions of the letters of said first and second word means, respectively, and said third word element group being lower portions of the letters of both said first and second word means, whereby when said first card means portion is folded to flushly cover said part of said second card means portion said first word means may be observed and when said first card means portion is folded to away from said second card means portion said different second word means may be observed.

2. Combination of claim 1, all of said word element groups extending from said indicia means to substantially identical distances.

3. Combination of claim 2, said dividing line being disposed substantially parallel to said fold line.

4. Combination of claim 3, said card means being rectangular and said fold line being substantially perpendicular to two opposite edges of said card means.

References Cited

UNITED STATES PATENTS

| | | | |
|---|---|---|---|
| 510,599 | 12/1893 | Harrison | 46—37 |
| 1,304,773 | 5/1919 | Howell | 46—37 |

FOREIGN PATENTS

| | | |
|---|---|---|
| 318,480 | 9/1929 | Great Britain. |

EUGENE R. CAPOZIO, Primary Examiner

WENCESLAO J. CONTRERAS, Assistant Examiner

U.S. Cl. X.R.

40—61; 46—37; 283—56